(12) United States Patent
Zukerman et al.

(10) Patent No.: US 9,188,446 B2
(45) Date of Patent: Nov. 17, 2015

(54) AGILE ACQUISITION OF LOCATION SERVICES IN A DEVICE

(71) Applicants: Gil Zukerman, Hod-HaSharon (IL); Anna Miskiewicz, Munich (DE); Ron Rotstein, Tel Aviv (IL)

(72) Inventors: Gil Zukerman, Hod-HaSharon (IL); Anna Miskiewicz, Munich (DE); Ron Rotstein, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 14/142,816

(22) Filed: Dec. 28, 2013

(65) Prior Publication Data

US 2015/0185015 A1    Jul. 2, 2015

(51) Int. Cl.
*G01C 21/00* (2006.01)
*G01S 19/13* (2010.01)

(52) U.S. Cl.
CPC ............... *G01C 21/00* (2013.01); *G01S 19/13* (2013.01)

(58) Field of Classification Search
CPC ........ H04W 24/00; G01C 21/00; G01S 19/13
USPC ........................................................ 701/468
See application file for complete search history.

(56) References Cited

U.S. PATENT DOCUMENTS

| | | | |
|---|---|---|---|
| 7,305,245 B2 * | 12/2007 | Alizadeh-Shabdiz et al. | 455/456.6 |
| 7,414,988 B2 * | 8/2008 | Jones et al. | 370/328 |
| 7,769,396 B2 * | 8/2010 | Alizadeh-Shabdiz et al. | 455/456.6 |
| 7,818,017 B2 * | 10/2010 | Alizadeh-Shabdiz et al. | 455/456.6 |
| 8,031,657 B2 * | 10/2011 | Jones et al. | 370/328 |
| 8,489,328 B2 * | 7/2013 | Lee | 701/459 |
| 8,630,664 B2 * | 1/2014 | Alizadeh-Shabdiz et al. | 455/456.5 |
| 8,837,363 B2 * | 9/2014 | Jones et al. | 370/328 |
| 8,965,412 B2 * | 2/2015 | Alizadeh-Shabdiz et al. | 455/456.5 |
| 2007/0135134 A1 * | 6/2007 | Patrick | 455/456.1 |
| 2012/0190386 A1 * | 7/2012 | Anderson | 455/456.3 |
| 2013/0184003 A1 * | 7/2013 | Alizadeh-Shabdiz et al. | 455/456.1 |

* cited by examiner

*Primary Examiner* — Mary Cheung
*Assistant Examiner* — Michael Berns
(74) *Attorney, Agent, or Firm* — Sutherland Asbill & Brennan LLP

(57) ABSTRACT

Aspects of the disclosure permit agile acquisition of a location service in a device. In one aspect of such acquisition, the device can rely on location signals available globally in order to determine a region associated with the device, and in response to determination of the region, the device can acquire service information representative or otherwise indicative of the location service based at least on the region. In another aspect, the device can be configured to consume the location service. The agility of such acquisition can stem from the absence of (i) scanning for location services associated with the area in which the device is present and/or (ii) a predefined pool of location services established in production of the device.

22 Claims, 12 Drawing Sheets

AGILE ACQUISITION OF LOCATION SERVICES IN A DEVICE

BACKGROUND

Conventional acquisition of location services in a location device generally include scanning for pre-established location-service sources (e.g., sources of location signals, such as timing messages or similar pilot or information signals) associated with a geographical area in which the location device is present. Such sources and/or a related pool of location services typically are established in production of the device. Further, procedures and associated information that permit such a scanning generally are implemented during production of the device. Accordingly, such conventional acquisition typically results in highly complex production protocols, especially as location-based services become more ubiquitous and demand thereof increases.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in one aspect, the issue of acquisition of location services in a location device, where the location services that may be acquired are established during production of the communication device. More specifically, yet not exclusively, the disclosure provides devices, systems, techniques, and/or computer program products that can permit agile acquisition of location service(s) in a computing device. As described in greater detail below, the computing device can rely on location signals available globally in order to determine a region in which the device is present. In response to the determination of the region, the device can acquire service information representative or otherwise indicative of the location service(s) based at least on the region. Availability of such service information permits configuration of the device to consume at least one of the location service(s). It can be appreciated that, in one aspect, the agility of such acquisition can stem from the absence of (i) scanning for pre-established location services associated with the region in which the device is present and/or (ii) a pre-defined pool of location services established in production of the device. In another aspect, the agility of the acquisition can stem from the identification of available location service(s) in such a region prior to configuration of device for consumption of a specific location service that may be available, without reliance on pre-established location services associated with the device.

Embodiments of the disclosure provide various advantages over conventional technologies for acquisition of location service in a multi-mode location device. One example advantage may include improved performance (e.g. lesser search time and lesser power consumption associated with identifying the available services) of computing devices that utilize or otherwise consume location services, and ensuing improved end-user experience or perceived quality of service. Another example advantage may include cost reduction via reduction of production cycle(s) and/or chipset size(s). In particular, yet not exclusively, device complexity can be reducing or otherwise containing availability of superfluous functionality in a device, with the ensuing reduction in the amount of stock keeping units (SKUs) and special configuration of the device. Yet another example advantage may include increased reliability of computing devices (e.g., location devices) that consume location services (e.g., navigation services) from a plurality of sources. Still another example may include the implementation of slim system design, where network infrastructure can be reused between location service systems in instances in which functional elements or parts of the subsystem are not available or need not be used.

Figure 1:
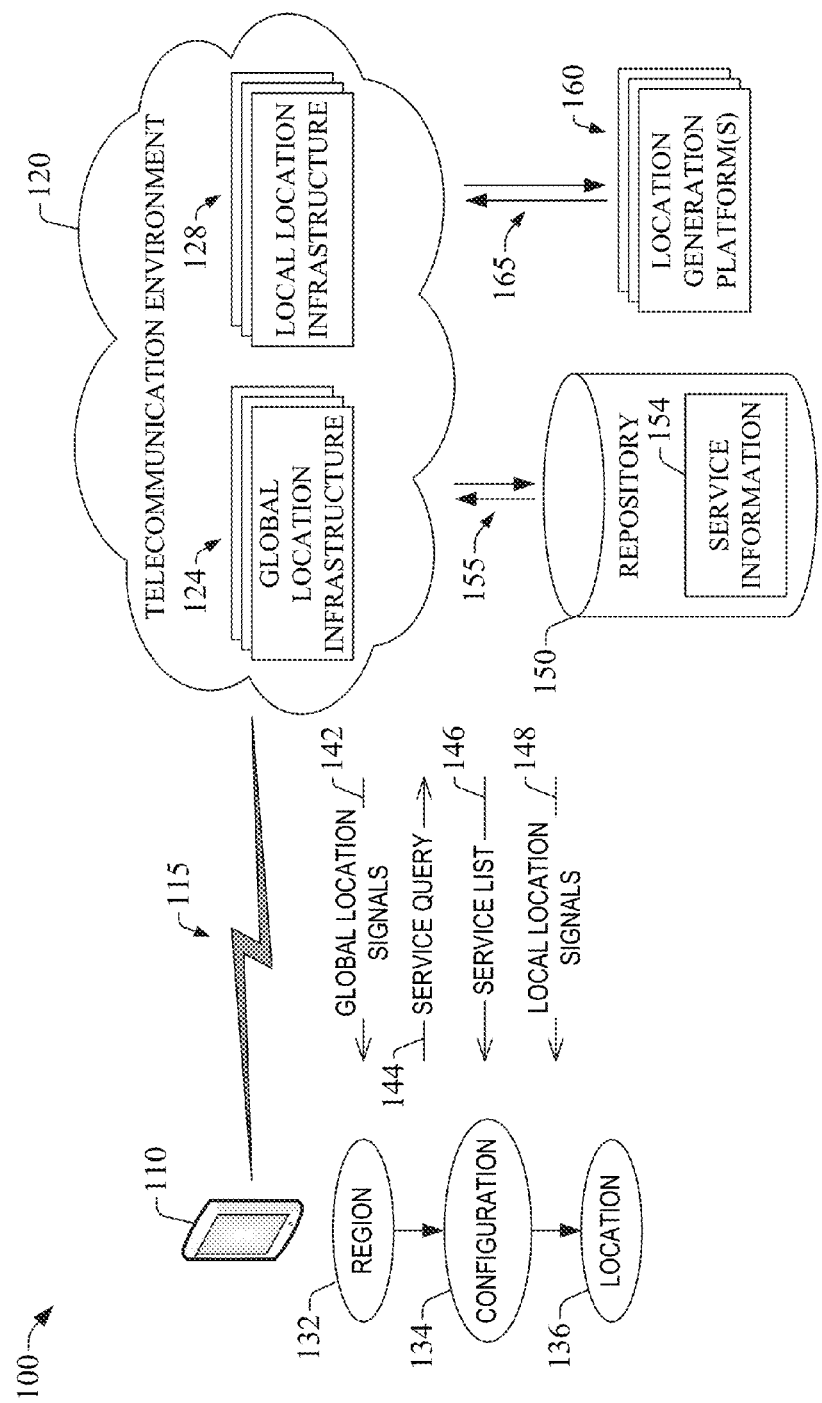
FIGS. 1-2 illustrate examples of operational environments in accordance with one or more aspects of the disclosure.

Referring to the drawings, FIG. 1 presents an example of an operational environment 100 in accordance with one or more aspects of the disclosure. As illustrated, the operational environment 100 can include a computing device 110 that can operate in accordance with a group of telecommunication protocols associated with respective telecommunication systems. The computing device 110 can be functionally coupled (e.g., communicatively coupled) to a telecommunication environment 120 via communication links 115, which can comprise wireline link(s), wireless link(s), a combination thereof, or the like. The communication links 115 can include downstream link(s) (DL(s)) and upstream link(s) (UL(s)). The computing device 110, as well as other computing devices contemplated in the present disclosure, can include electronic devices having computational resources, including processing resources (e.g., processor(s)), memory resources (memory devices (also referred to as memory), and communication resources for exchange of information within the computing device and/or with other computing devices. Such resources can have different levels of architectural complexity depending on specific device functionality. Exchange of information among computing devices in accordance with aspects of the disclosure can be performed wirelessly as described herein, and thus, in one aspect, the computing device 110 also can be referred to as wireless computing device 110 or wireless device 110 interchangeably. Example of computing devices contemplated in the present disclosure include desktop computers with wireless communication resources; mobile computers, such as tablet computers, smartphones, notebook computers, laptop computers with wireless communication resources, Ultrabook™ computers; gaming consoles, mobile telephones; blade computers; programmable logic controllers; near field communication devices; customer premises equipment with wireless communication resources, such a set-top boxes, wireless routers, wireless-enabled television sets, or the like; and so forth. The wireless communication resources can include radio units (also referred to as radios) having circuitry for processing of wireless signals, processor(s), memory device(s), and the like, where the radio, the processor(s), and the memory device(s) can be coupled via a bus architecture.

The communication links 115 can permit communication (e.g., exchange of information) between the computing device 110 (which also may be herein referred to as device 110) and global location infrastructure 124 and/or local location infrastructure 128. The communication links 115 can comprise wireless link(s), wireline link(s), a combination thereof, or the like.

Figure 3:
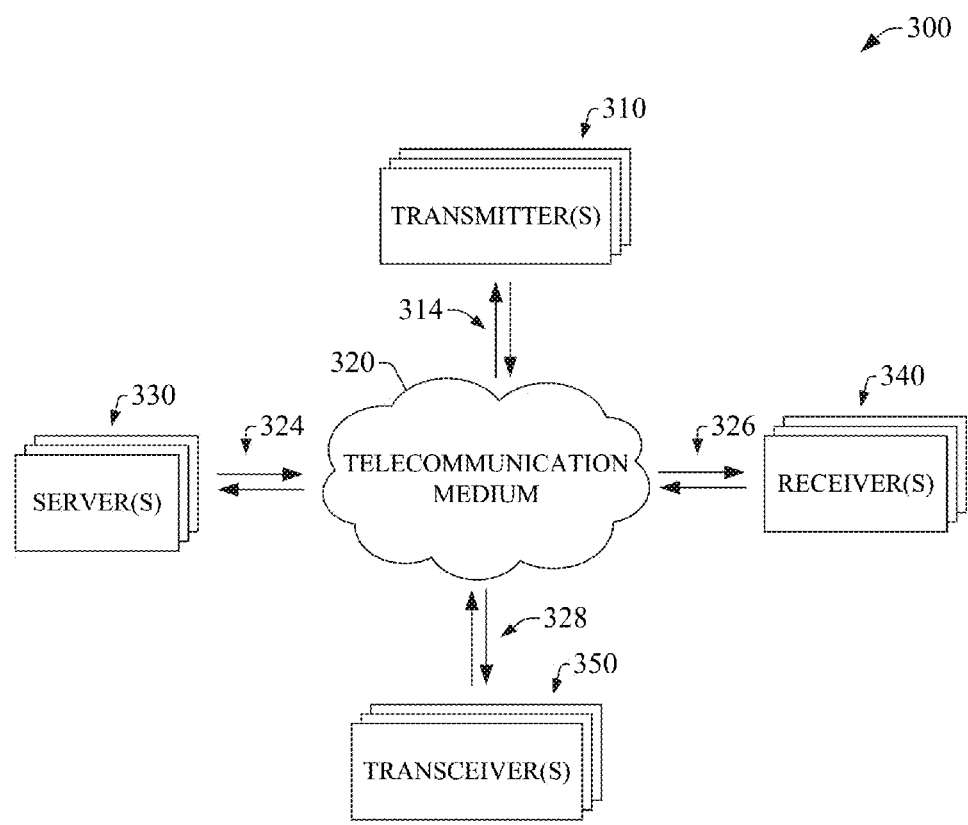
FIG. 3 presents an example of a telecommunication environment in accordance with one or more aspects of the disclosure.

A functional element of the global location infrastructure 124 and/or a functional element of the local location infrastructure 128 can be functionally coupled to a repository 150 via link(s) 155. As illustrated, the repository 150 can include service information indicative or otherwise representative of location services that may be available in a geographical region (also herein referred to as region). The service information can be retained in one or more memory components (e.g., memory device(s), registers, databases, files, and the like), which can be referred to as service information 226. In addition, one or more functional elements of the local location infrastructure 128 can be functionally coupled to one or more location generation platforms 160 via link(s) 165. In certain example implementations, such as operational environment 200, the telecommunication environment 120 can be partitioned (logically and/or physically) into two environments: a global telecommunication environment 210 and a location telecommunication environment 220. Each of such environments can include wireline functional elements, wireless functional elements (cellular or otherwise), and connectivity or functional coupling elements (such as link, reference links, combinations thereof, or the like) that can permit communication and/or operation of the computing device 110 according to a telecommunication standard (wireless or wireline). The global telecommunication environment 210 can permit operation of the computing device 110 regardless of the specific geographic area in which the device is located, whereas the global communication environment 220 can permit, at least in part, operation of the computing device 110 according to the specific geographic area in which the device is present. Each of the global telecommunication environment 210 and the local telecommunication environment 220 can include infrastructure elements and a telecommunication medium comprising wireline interfaces for communication and/or wireless interfaces (e.g., air interfaces according to specific radio technology protocols). The computing device 110 can be functionally coupled to at least some infrastructure elements (e.g., a transmitter or a transceiver) of the global communication environment via link(s) 218 (e.g., wireless link(s), wireline link(s), a combination thereof, or the like). Similarly, the computing device 110 can be functionally coupled to at least some infrastructure elements (e.g., a transmitter or a transceiver) of the local telecommunication environment 210 via link(s) 224 (e.g., wireless link(s), wireline link(s), a combination thereof, or the like). FIG. 3 presents an example telecommunication environment 300 that can represent the structure of each of the telecommunication environments 210 and 220. As illustrated, the telecommunication environment 300 can include one or more transmitters 310, one or more receivers 340, one or more transceivers 350, and one or more servers 330. It should be appreciated that at least one or each of the transmitter(s) 310 can include one or more antennas for wireless communication in accordance with a radio technology protocol. Similarly, at least one or each of the receiver(s) 340 can include one or more antennas for wireless communication in accordance with a radio technology protocol, and at least one or each of the transceiver(s) 350 also can include one or more antennas for wireless communication in accordance with a radio technology protocol. In addition, at least one of the transmitter(s) 310 can be functionally coupled, via link(s) 314, to a telecommunication medium 320 that permits communication with remote functional elements within the telecommunication environment and remote computing devices (e.g., computing device 110). Similarly, at least one of the server(s) 330 can be functionally coupled to the telecommunication medium 320 via link(s) 324; at least one of the receiver(s) 340 can be functionally coupled to the telecommunication medium 320 via link(s) 326; and at least one of the transceiver(s) 350 can be functionally coupled to the telecommunication medium 320 via link(s) 328. The telecommunication medium 320 can be embodied in or can comprise a wireline network (e.g., a cable network, an internet-protocol (IP) network, an industrial control network, any wide area network WAN, a local area network (LAN), a personal area network (PAN), a sensor-based network, or the like); a wireless network (e.g., a cellular network (either small-cell network or macro-cell network), a wireless WAN (WWAN), a wireless LAN, a wireless PAN, a sensor-based network, a satellite network, or the like); a combination thereof; or the like. It should be appreciated that in certain embodiments, at least some of such functional elements (e.g., transceiver(s) 350, receiver(s) 340, transmitter(s) 310, or server(s) 330) may not be present in the telecommunication environment 300.

Figure 2:
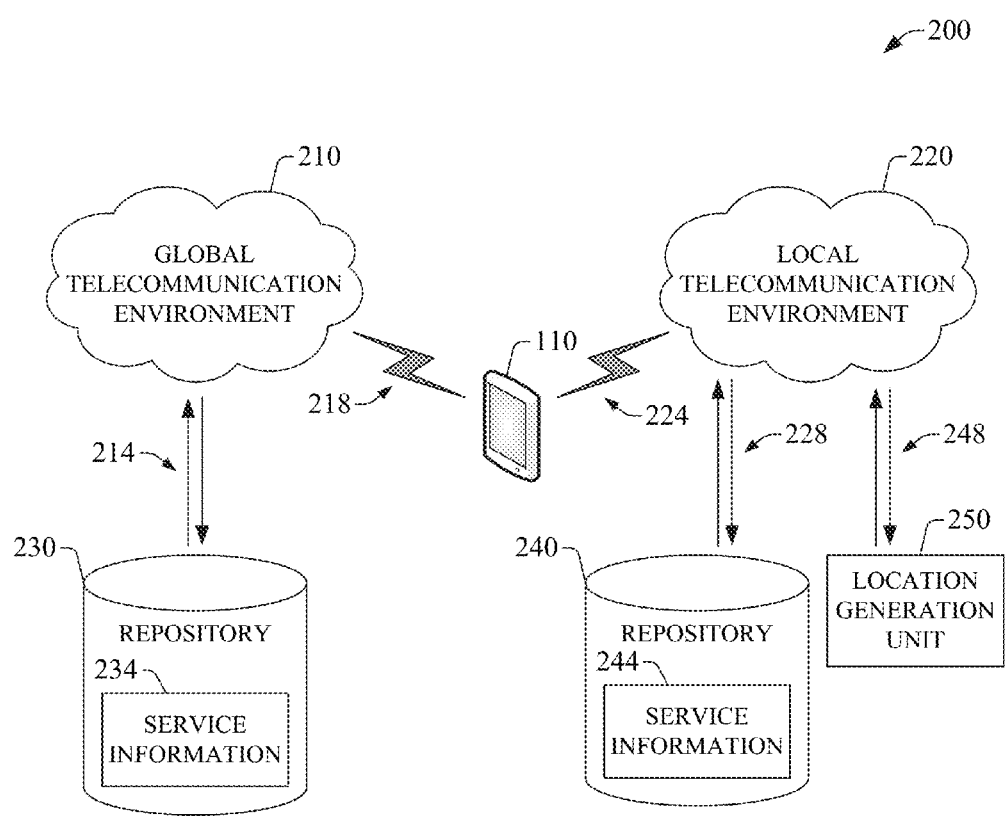

As illustrated in FIG. 2, the global communication environment 210 can be functionally coupled via link(s) 214 to a repository 230 containing service information 234 in accordance with aspects described herein. In one aspect, the service information 234 can include information indicative of globally available location services. In addition, the local communication environment 220 can be functionally coupled via link(s) 228 to a repository 240 containing service information 244 in accordance with aspects described herein. In one aspect, the service information 244 can include information indicative of locally available location services. The local telecommunication environment 220 also can be functionally coupled (e.g., communicatively or otherwise operationally coupled) to a location generation unit 250 via link(s) 248. The location generation unit 250 can determine (e.g., select, compute, select and compute, or the like) an estimate of the ground-truth location (also referred to as location) of the computing device 110. It should be appreciated that, in certain embodiments, the computing device 110 can include or be directly functionally coupled to a location generation unit (not depicted in FIG. 2) which can produce such a location estimate. It should be appreciated that, in at least certain aspects, the repository 230 and the repository 240 and the respective groups of memory elements 234 and 244 can include functional elements and information that permits obtaining or otherwise determining a location estimate of a ground-truth location. As described herein, the service information 234 and/or the service information 244 can include one or more of a list of all available location services for a specific geographic regions; a list of all small-cell (e.g., Wi-Fi or femtocell) access points with their associated location; a list of all cellular (e.g., macro-cellular) base stations and their associated location; a list of global sensor deployments; combination thereof or the like. In addition one or more of the repository 230 or the repository 240 can be integrated into or functionally coupled to navigation map servers and/or location servers that can be utilized or otherwise leveraged by a location service provider (e.g. SUPL servers, cellular operators location servers, third-party small-cell (e.g., Wi-Fi or femtocell) location servers, and the like.

With reference to the telecommunication environment 120, the global location infrastructure 124 can include one or more transmitters (which may be referred to as "GLI transmitters") that can communicate (e.g., transmit) global location signals 142 to the computing device 110 via a DL of the links 115. In one embodiment, the one or more transmitters can be embodied in or can constitute a satellite transmitter, and the DL can comprise a deep-space wireless link configured according to a specific telecommunication protocol. In certain environments, e.g., operational environment 200, the global location infrastructure 124 can constitute the global telecommunication environment 210. The computing device 110 can acquire global location signals 142 and can identify or otherwise determine a region (e.g., a country) in which the computing device 10 is present. Determination of the region or information indicative thereof can be effected in a first stage of the agile location service acquisition in accordance with the disclosure. Such stage may be referred to as region 132, and can be implemented locally at the computing device 110 or at least partially remotely.

In response to determining the region in which the computing device is present, the computing device 110 can communicate (e.g., transmit) a service query 144 including information indicative of the region. The service query can be communicated (e.g., transmitted) to a node of the GLI 124. The node (e.g., a server computer) can process the service query 144 and can provide a service list 146 or other service information structure (e.g., a data structure, a metadata structure, and/or a signaling structure) indicative or otherwise representative of a location service that can be available in such a region. The node can provide (e.g., communicate) the service list 146 or the other service information structure to the computing device 110. In one aspect of processing, the node can utilize or otherwise leverage the information indicative of the region as available in the service query 144 in order to identify or otherwise extract information indicative of one or more location services that may be available in the region. Such information can be identified or otherwise extracted from the service information 154. In one implementation, for example, the service information 154 can include information (e.g., a list or other information structure) indicative of location services available for one or more geographic areas or regions. For instance, the service information 154 can include information (e.g., data, metadata, and/or signaling) indicative of a mapping between location services and regions, and as part of processing the service query 144, the node can utilize or otherwise leverage such a mapping in order to extract the location service that is associated with the region in which the device 110 is present.

The computing device 110 can acquire the service list 146, and can configure itself to consume a location service of the location service(s) conveyed in the service list 146 (or any other service information structure indicative of the location service(s)). To at least such an end, in one aspect, the computing device 110 can configure circuitry therein to acquire signals according to a specific radio protocol that can be utilized or otherwise leveraged by a transmitter (e.g., a satellite; a cellular base station; a dwelling-based, low-power access point; or the like) associated with the location service. Such configuration is herein referred to as configuration stage 134.

After implementation of the configuration stage 136, the device 110 can acquire local location signals 148 from a transmitter that can be contained within the local location infrastructure 128. Based on at least the local location signals 148, the device 110 can determine a device location at which the device 110 is positioned. Determination of the device location or information indicative thereof can be effected in a service consumption stage, referred to as location 136, and can be implemented locally at the device 110 or at least partially remotely.

Figure 4:
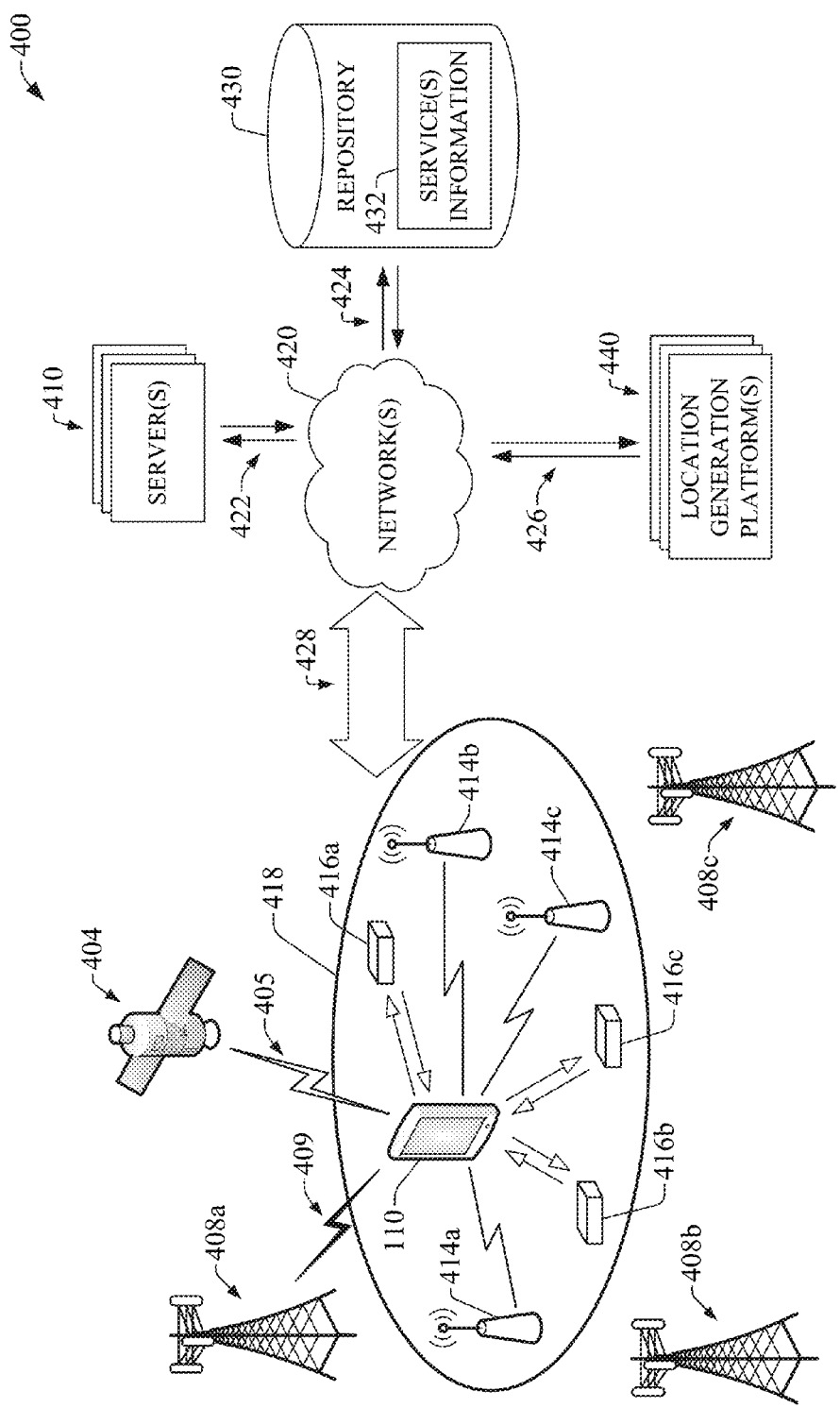
FIG. 4 presents another example of an operational environment in accordance with one or more aspects of the disclosure.

FIG. 4 presents a block diagram of an example of an operational environment 400 for agile acquisition of location service in accordance with at least certain aspects of the disclosure. The operational environment 400 includes several telecommunication infrastructures, which can embody or otherwise constitute the telecommunication environment 120. More specifically, yet not exclusively, the telecommunication infrastructures can include a satellite system 404. As described herein, the satellite system 404 can be embodied in or can include a global navigation satellite system (GNSS), such as the Global Positioning System (GPS), Galileo, GLONASS (Globalnaya navigatsionnaya sputnikovaya sistema), BeiDou Navigation Satellite System (BDS), and/or the Quasi-Zenith Satellite System (QZSS). In addition, the telecommunication infrastructures can include a macro-cellular or large-cell system; which is represented with three base stations 408*a*-408*c*; a micro-cellular or small-cell system, which is represented with three access points (or low-power base stations) 414*a*-414*c*; and a sensor-based system—which can include proximity sensor(s), beacon device(s), pseudo-stationary device(s), and/or wearable device(s)—represented with functional elements 416*a*-416*c*. As illustrated, in one implementation, each of the transmitter(s), receiver(s), and/or transceiver(s) included in a telecommunication infrastructure of the telecommunication environment 120 can be functionally coupled (e.g., communicatively or otherwise operationally coupled) with the wireless device 110 via wireless link(s) in accordance with specific radio technology protocols. For another example, a base station (e.g., base station 408*a*) can be functionally coupled to the wireless device 110 via an upstream wireless link (UL) and a downstream link (DL) (e.g., links 409) configured in accordance with a radio technology protocol for macro-cellular wireless communication (e.g., 3G, LTE, or LTE Advanced). For yet another example, an access point (e.g., access point 414*a*) can be functionally coupled to the wireless device 110 via an UL and a DL configured in accordance with a radio technology protocol for small-cell wireless communication (e.g., femtocell protocols, Wi-Fi, and the like). For still another example, a beacon device (e.g., device 416*a*) can be functionally coupled to the mobile device with a UL-only (ULO), a DL-only, or an UL and DL, each of such wireless links (represented with open-head arrows) can be configured in accordance with a radio technology protocol for point-to-point or short-range wireless communication (e.g., Zigbee, Bluetooth, or near field communication (NFC) standards, ultrasonic communication protocols, or the like).

In the operational environment 400, the small-cell system and/or the beacon devices can be contained in a confined area 418 that can include an indoor region (e.g., a commercial facility, such as a shopping mall) and/or a spatially-confined outdoor region (such as an open or semi-open parking lot or garage). The small-cell system and/or the beacon devices can provide wireless service to a device (e.g., wireless device 110) within the confined area 418. For instance, the mobile device 110 can handover from macro-cellular wireless service to wireless service provided by the small-cell system present within the confined area 418. Similarly, in certain scenarios, the macro-cellular system can provide wireless service to a device (e.g., the wireless device 110) within the confined area 418.

In addition, in certain embodiments, at least one (e.g., one, two, more than two, each) of the telecommunications systems included in the telecommunication infrastructures of the operational environment 400 can be functionally coupled to a server (e.g., at least of the one or more of the servers 410). Further, the at least one communication can be functionally coupled to a repository 430 and at least one location platform of the group of location generation platforms 440 via at least one of the group of traffic and signaling pipe(s) 428 and at least one network of the group of networks 420. To implement at least such functional couplings, in one aspect, the operational environment 400 can include a group of one or more traffic and signaling pipes 428 and a group of networks 420 that can permit functional coupling of a functional element of a telecommunication system with the server in the server(s) 410. A traffic and signaling pipe of the traffic and signaling pipe(s) 428 can include one or more backhaul links (e.g., communication media (coaxial cables, optical fiber, combinations thereof, or the like), routers, gateways, hubs, servers, and the like) that can permit functionally coupling the functional element of the at least one telecommunication system to a network element of the network(s) 420 which can be functionally coupled to the server via link(s) 422.

In a scenario in which the communication between the wireless device 110 and the satellite system 404 is unavailable due to, for example, poor radio reception in indoor areas of the confined area 418, indoor navigation can be utilized or otherwise relied upon in order to obtain service availability in accordance with at least certain aspects of the disclosure. In such a scenario, the mobile device 110 can acquire or otherwise detect pilot signals from one or more base stations (e.g., base stations 408a-408b) in the vicinity of the confined area 418, and based on such signals, the mobile device 110 can determine or otherwise acquire one or more wireless networks associated with the pilot signals. Based at least on the pilot signals, the wireless device 110 can determine an estimate of the location thereof. To at least such an end, in one implementation, the wireless device 110 can perform a base-station triangulation from pilot signals obtained from a wireless network that is acquired. In another implementation, the wireless device 110 can determine a country code from the pilot signals. For instance, in one embodiment, the wireless device 110 can detect a broadcast control channel (BCCH) within a global system for mobile communications (GSM), and can extract a location area identity (LAI) and/or a cell global identity (CGI). The LAI contains a country code and the CGI identifies a cell that can provide service to the wireless device 110, and thus, such location information can convey a location of the wireless device 110.

Further, the mobile device 110 can determine a location based at least on reception or exchange of pilot signals with (i) one or more access points (APs) of the small-cell system contained in the confined area 418, and/or (ii) one or more sensors of the sensor-based system contained in the confined area 418. In scenario (i), the wireless device 110 can scan APs (e.g., acquire or otherwise detect pilot signals from APs) and can match or otherwise associate a position of at least one of the one scanned AP(s). To at least such an end, in one aspect, the wireless device 110 can utilize or otherwise leverage a server of the server(s) 410 and/or the location service(s) information 432 in order to access location information of a scanned AP. Based on such positions and time of flight (TOF) measurements, the wireless device 110 can perform an AP triangulation in order to determine a position within the confined area 418. In addition or in the alternative, the wireless device 110 can determine a group of signal strengths metrics (such as RSSI(s)) from the scanning, and based at least on such metrics can determine a location within the confined area 418. For example, the wireless device 110 can assign the location of the AP having the highest RSSI to the location of the wireless device 110.

In scenario (ii), which may be referred to as the dead-reckoning scenario, the wireless device 110 can measure pilot signals from a proximity device (e.g., a beacon device, an ultrasonic transmitter, a NFC transmitter or transceiver, a wearable device, or the like), and based on the pilot signals, the wireless device 110 can associate a location of the proximity device to the location of the wireless device 110. To at least such an end, in implementation, the wireless device 110 can utilize or otherwise leverage a server of the server(s) 410 and/or the location service(s) information 432 in order to access a tagging database or information structure containing information indicative of the location of the proximity device. The server can be embodied in a commercially available server (e.g., Google Maps server, Microsoft Orion server, a Skyhook server, or the like) or a custom, proprietary server made available by a telecommunication service provider of the wireless device 110. In other implementations, a tagging database or information structure can be available locally in the wireless device 110.

As described herein, after an initial location of the wireless device 110 is acquired, the wireless device 110 can access location service(s) information 432 within the repository 430, and can obtain or otherwise receive a location service that is available to the wireless device 110 in accordance with such a location. The wireless device 110 can rely on such location service to collect or otherwise receive suitable location signals in order to generate location estimates for the location of the wireless device 110 that can be more refined (e.g., more accurate or precise) than the initial location.

Figure 5:
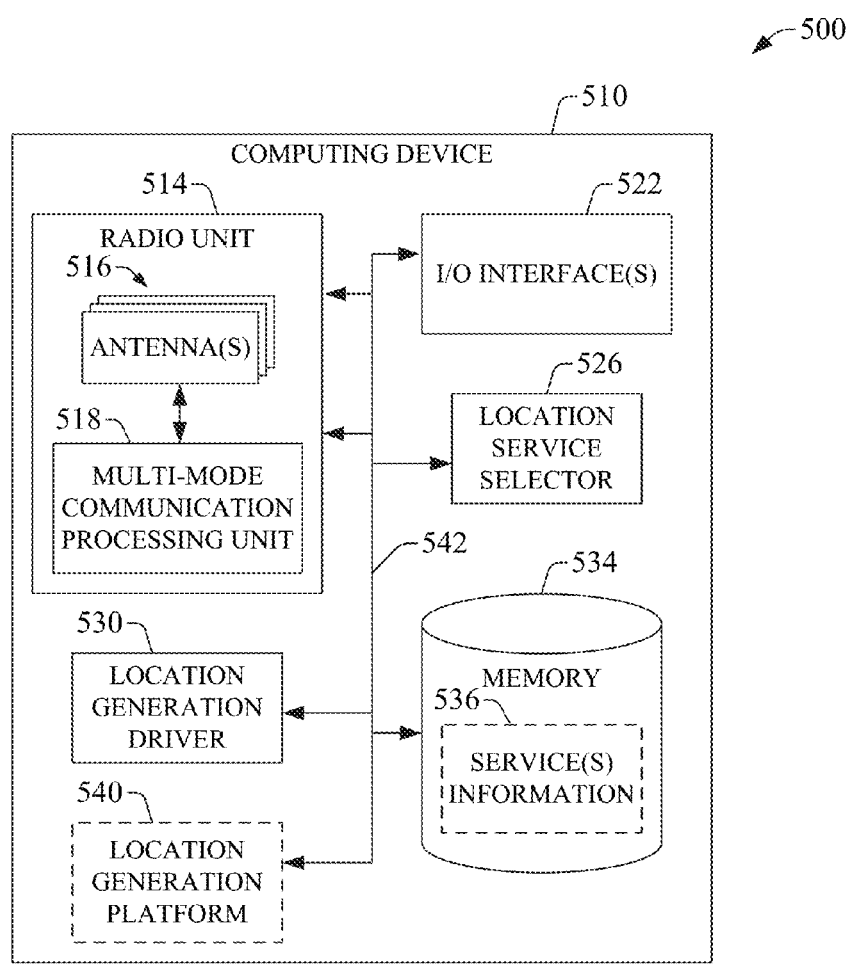
FIG. 5 presents an example of a computing device in accordance with one or more aspects of the disclosure.
Figure 6:
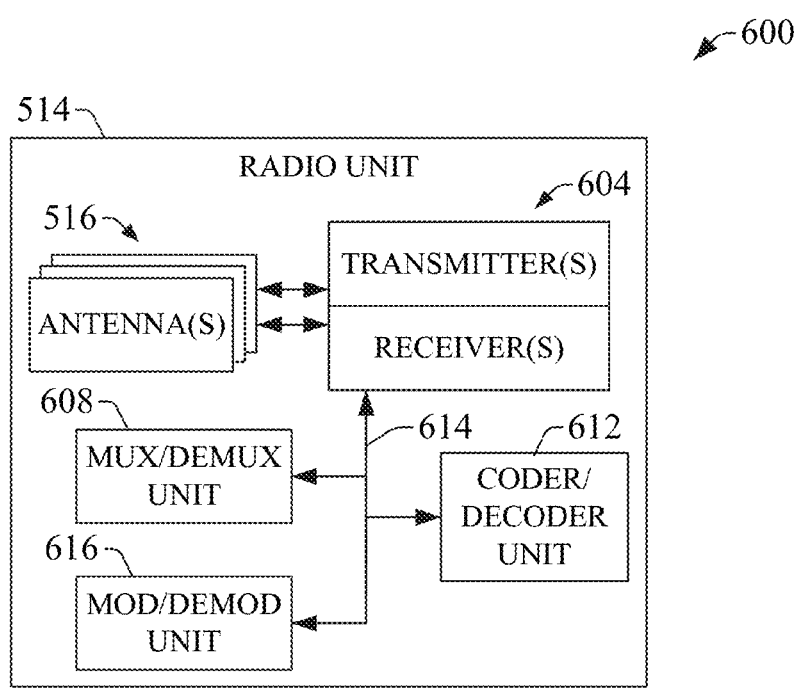
FIG. 6 presents an example of a radio unit in accordance with one or more aspects of the disclosure.

FIG. 5 illustrates a block-diagram of an example embodiment 500 of the computing device 510 that can operate in accordance with at least certain aspects of the disclosure. As described herein, the computing device 510 can operate as a wireless device and can embody or can comprise a communication device of the disclosure, such as the computing device 110. To permit wireless communication with GLI functional elements and/or LLI functional elements, in one aspect, the computing device 510 includes a radio unit 514 having one or more antennas 516 and a multi-mode communication processing unit 518 that can process at least wireless signals in accordance with one or more radio technology protocols and/or modalities (such as multiple-input-multiple-output (MIMO), single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3rd Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The communication processing unit 218 also can process non-wireless signals (analogic, digital, optical, a combination thereof, or the like). In one embodiment, e.g., example embodiment 600 shown in FIG. 6, the multi-mode communication processing unit 518 can comprise a set of one or more transmitters/receivers 604, and components therein (amplifiers, filters, analog-to-digital (A/D) converters, etc.), functionally coupled to a multiplexer/demultiplexer (mux/demux) unit 608, a modulator/demodulator (mod/demod) unit 616 (also referred to as modem 616), and a coder/decoder unit 612 (also referred to as codec 612). Each of the transmitter(s)/receiver(s) can form respective transceiver(s) that can transmit and receive wireless signal (e.g., electromagnetic radiation) via the one or more antennas 516. It should be appreciated that in other embodiments, the multi-mode communication processing unit 518 can include other functional elements, such as one or more sensors, a sensor hub, an offload engine or unit, a combination thereof, or the like.

Electronic components and associated circuitry, such as mux/demux unit 608, codec 612, and modem 616 can permit or facilitate processing and manipulation, e.g., coding/decoding, deciphering, and/or modulation/demodulation, of signal(s) received by the computing device 510 and signal(s) to be transmitted by the computing device 510. In one aspect, received and transmitted wireless signals can be modulated and/or coded, or otherwise processed, in accordance with one or more radio technology protocols. Such radio technology protocol(s) can include $3^{rd}$ Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like).

The electronic components in the described communication unit, including the one or more transmitters/receivers 604, can exchange information (e.g., data, metadata, code instructions, signaling and related payload data, combinations thereof, or the like) through a bus 614, which can embody or can comprise at least one of a system bus, an address bus, a data bus, a message bus, a reference link or interface, a combination thereof, or the like. Each of the one or more receivers/transmitters 604 can convert signal from analog to digital and vice versa. In addition or in the alternative, the receiver(s)/transmitter(s) 604 can divide a single data stream into multiple parallel data streams, or perform the reciprocal operation. Such operations may be conducted as part of various multiplexing schemes. As illustrated, the mux/demux unit 608 is functionally coupled to the one or more receivers/transmitters 604 and can permit processing of signals in time and frequency domain. In one aspect, the mux/demux unit 608 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 608 can scramble and spread information (e.g., codes) according to most any code, such as Hadamard-Walsh codes, Baker codes, Kasami codes, polyphase codes, and the like. The modem 616 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device 610 (e.g., processor(s) included in the radio unit 514 or other functional element(s) of the computing device 610) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 612 can operate on information (e.g., data, metadata, signaling, or a combination thereof) in accordance with one or more coding/decoding schemes suitable for communication, at least in part, through the one or more transceivers formed from respective transmitter(s)/receiver(s) 604. In one aspect, such coding/decoding schemes, or related procedure(s), can be retained as a group of one or more computer-accessible instructions (computer-readable instructions, computer-executable instructions, or a combination thereof) in one or more memory devices 534 (referred to as memory 534). In a scenario in which wireless communication among the computing device 510 and another computing device (e.g., a GLI transmitter or a LLI transmitter) utilizes multiple-input multiple-output (MIMO), multiple-input single-output (MISO), single-input multiple-output (SIMO) or single-input single-output (SISO) operation, the codec 612 can implement at least one of space-time block coding (STBC) and associated decoding, or space-frequency block (SFBC) coding and associated decoding. In addition or in the alternative, the codec 612 can extract information from data streams coded in accordance with spatial multiplexing scheme. In one aspect, to decode received information (e.g., data, metadata, signaling, or a combination thereof), the codec 612 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 612 can utilize, at least in part, mux/demux component 608 and mod/demod component 616 to operate in accordance with aspects described herein.

The computing device 510 can operate in a variety of wireless environments having wireless signals conveyed in different electromagnetic radiation (EM) frequency bands, and thus, the computing device 510 may be referred to as wireless computing device 510 or wireless device 510. To at least such end, the multi-mode communication processing unit 518 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 510 can determine a geographical region in which it is present. To at least such an end, in one aspect, the computing device 510 can acquire or otherwise access first location signal(s) via the radio unit 514 (also referred to as radio 514). The first location signal(s) can be acquired form infrastructure that is available for communication with the computing device 510. In the illustrated embodiment, the computing device 510 can acquire the first location signal(s) via at least the radio 514. For example, in outdoor scenarios, the first location signal(s) can originate in a satellite system (e.g., GPS, GLONASS, Galileo, BeiDou, or the like) which can be included in global location infrastructure 124. In an indoor scenario, the first location signal(s) can be provided by a macro-cellular telecommunication system and/or a small-cell system available in the vicinity of the computing device 510. In scenarios in which neither satellite-based telecommunication nor macro-cellular-based telecommunication, the computing device 510 can rely on wide-access network connectivity (e.g., access to an IP network), where the first location signal(s) can be associated with a server of a service provider of such connectivity. In certain scenarios, the first location signal(s) can be or can include global location signals.

As described herein, in certain implementations, the geographical region associated with the computing device 510 can be determined at a remote computing device (such as a network node). To at least such an end, a location generation driver 530 can communicate the acquired first location signal(s) to the remote computing device via at least the radio 514. In the alternative, in certain embodiments, such a geographical region can be determined locally at the computing device 510. In one such embodiment, the computing device 510 can include a location generation platform 540 which can determine or otherwise generate a location estimate for the geographical region based on the acquired first location signal(s).

Based on the geographical region in which the computing device 510 is present, the computing device 510 can be configured to consume a specific location service that is available in such a region. To at least such an end, in certain embodiments, the computing device 510 can communicate via the radio 514 a service query to a remote computing device (e.g., a repository, such as repository 230 or repository 240) for identification of location service(s) that are available in the region. The location service selector can generate such a query. In other embodiments, the service query can be communicated internally, via a bus 542 to one or more memory elements 536 (referred to as service(s) information 536) contained within one or more memory devices (referred to as memory 534) in the computing device 510.

In response, the computing device 540 can receive information (e.g. a list or other information structure) indicative of one or more location services that may be available in the region. Such information may be referred to as service information and can be received remotely or locally. In a scenario in which the service information is received remotely, the remote computing device that provides such information can utilize or otherwise leverage information indicative of the geographical region associated with the computing device 540 in order to provide (e.g., acquire and communicate) at least a portion of the service information. The location service selector 526 can receive at least a portion of such information, and can configure the computing device 540 to consume at least one of the location service(s) conveyed by the service information.

Based on access to at least one of the location service(s) available to the computing device 540, the location generation driver 530 can obtain or otherwise determine an estimate of the location of the computing device 510. As described herein, such an estimate can be obtained or otherwise determined in at least two modalities: remote and local. In either modality, the computing device 540, via the location generation driver 530, for example, can acquire or otherwise access second location signal(s), such as local location signal(s) that can be provided by a local location infrastructure (LLI) transmitter that is associated with a location service available to the computing device 540. Based on the such signal(s), the estimate of the location of the computing device 540 can be determined. In the remote modality, the location generation driver 530 can generate or otherwise provide a location query containing at least a portion of the second location signal(s), and can communicate, via the radio 514, such a query to a remote computing device. In response, the remote computing device can determine the location and can convey it to the computing device. In the alternative, in the local modality, the local generation driver 530 can utilize or otherwise leverage the location generation platform 540 in order to determine the estimate of the location (also referred to as location) of computing device 540 based on at least a portion of the second location signal(s) (e.g., local location signal(s)).

As described herein, in certain implementations, the memory 534 can contain one or more memory elements 536 (referred to as service(s) information 536) having information indicative of location services available in certain geographic areas or regions in accordance with aspects described herein. It should be appreciated that, in one aspect, availability of the service(s) information 536 in the memory 534 can be optional. In certain implementations, the service(s) information 536 can be embodied in a removable element, such as a subscriber identification module (SIM) card storage, a universal integrated circuit card (UICC) storage, or a removable user identity module (RUIM). The memory 534 also can include a functionality information storage (not depicted) which can include information specific to the agile acquisition of location services in accordance with aspects of the disclosure. For instance, the repository 534 can contain procedure or methods to determine a location estimate of a ground-truth location based on various wireless signals (e.g., pilot signals) received at the computing device 540. While not shown, in certain embodiments, one or more memory elements of the memory 534 can include computer-accessible instructions that can be executed by one or more of the functional elements of the computing device 510 in order to implement at least some of the functionality for agile acquisition of location services in accordance with aspect of the disclosure. One or more groups of such computer-accessible instructions can embody or can constitute a programming interface that can permit communication of information (e.g., data, metadata, and/or signaling) between functional elements of the computing device 510 for implementation of such functionality.

Figure 7:
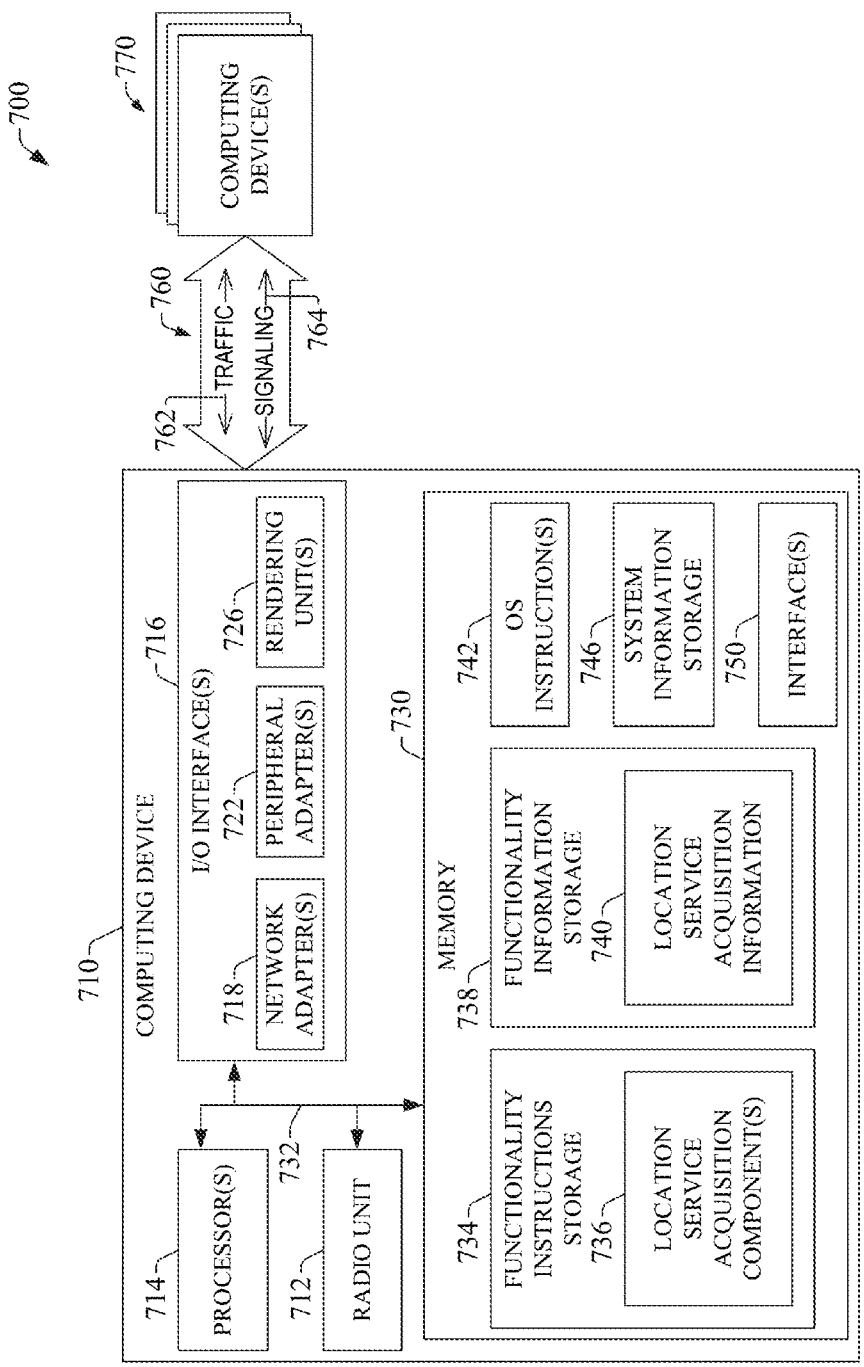
FIG. 7 presents an example of an operational environment in accordance with one or more aspects of the disclosure.

FIG. 7 illustrates an example of a computational environment 700 for agile acquisition of location services in accordance with one or more aspects of the disclosure. The example computational environment 700 is only illustrative and is not intended to suggest or otherwise convey any limitation as to the scope of use or functionality of such computational environments' architecture. In addition, the computational environment 700 should not be interpreted as having any dependency or requirement relating to any one or combination of components illustrated in this example computational environment. The illustrative computational environment 700 can embody or can comprise the computing device 110 and/or functional elements of the global location infrastructure 124 and/or functional elements of the local location infrastructure 128.

The computational environment 700 represents an example of a software implementation of the various aspects or features of the disclosure in which the processing or execution of operations described in connection with agile acquisition of location services can be performed in response to execution of one or more software components at the computing device 710. It should be appreciated that the one or more software components can render the computing device 710, or any other computing device that contains such components, a particular machine for agile acquisition of location services in accordance with aspects described herein, among other functional purposes. A software component can be embodied in or can comprise one or more computer-accessible instructions, e.g., computer-readable and/or computer-executable instructions. In one scenario, for example, at least a portion of the computer-accessible instructions can embody one or more of the example techniques presented in FIGS. 8-12 and described herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with agile acquisition of location services in accordance with features described herein can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional element therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit or otherwise facilitate communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. In one aspect, at least one of the network adapter(s) 718 can couple functionally the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as liquid crystal display (LCD), combinations thereof, or the like) that can permit control of the operation of the computing device 710, or can permit conveying or revealing operational conditions of the computing device 710.

In one aspect, the bus 732 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system.

The computing device 710 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as location service acquisition component(s) 736. In one scenario, execution of at least one component of the location service acquisition component(s) 736 can implement one or more of the example methods 1000 through 1100. For instance, such execution can cause a processor that executes the at least one component to carry out a disclosed example method. It should be appreciated that, in one aspect, a processor of the processor(s) 714 that executes at least one of the location service acquisition component(s) 736 can retrieve information from or retain information in a memory element 740 in the functionality information storage 738 in order to operate in accordance with the functionality programmed or otherwise configured by the location service acquisition component(s) 736. Such information can include at least one of code instructions, information structures, or the like. At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of the location service acquisition component(s) 736 or location service acquisition information 740 can program or otherwise configure one or more of the processors 714 to operate at least in accordance with the functionality described herein. In certain embodiments, the location service acquisition component(s) 736 contained in the functionality instruction(s) storage 734 can include the location service selector 526, the location generation driver 530, the location generation platform 540, or any combination thereof. For instance, at least one of the processor(s) 714 and at least one of the I/O interface(s) 716 (e.g., a network adapter) can embody a communication unit of the exchange component 210 (see, e.g., FIG. 5). One or more of the processor(s) 714 can execute at least one of such components and leverage at least a portion of the information in the storage 738 in order to provide agile acquisition of location services in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of processor(s) 714) to perform a group of operations comprising the operations or blocks described in connection with the disclosed methods.

In addition, the memory 730 can comprise computer-accessible instructions and information (e.g., data and/or metadata) that permit or facilitate operation and/or administration (e.g., upgrades, software installation, any other configuration, or the like) of the computing device 710. Accordingly, as illustrated, the memory 730 can comprise a memory element 742 (labeled OS instruction(s) 742) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 710 can dictate a suitable OS. The memory 730 also comprises a system information storage 746 having data and/or metadata that permits or facilitates operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the operating system instruction(s) 742, are illustrated herein as discrete blocks, such software components can reside at various times in different memory components of the computing device 710, and can be executed by at least one of the processor(s) 714. In certain scenarios, an implementation of the location service acquisition component(s) 736 can be retained on or transmitted across some form of computer readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In view of the aspects described herein, examples of techniques that can be implemented in accordance with the disclosure can be better appreciated with reference to the diagrams in FIGS. 8-12. For purposes of simplicity of explanation, the examples of the techniques disclosed herein are presented and described as a series of blocks (with each block representing an action or an operation in a method, for example). However, it is to be understood and appreciated that the disclosed techniques (e.g., process(es), procedure(s), method(s), or the like) are not limited by the order of blocks and associated actions or operations, as some blocks may occur in different orders and/or concurrently with other blocks from that are shown and described herein. For example, the various techniques of the disclosure can be alternatively represented as a series of interrelated states or events, such as in a state diagram. Furthermore, not all illustrated blocks, and associated action(s) or operation(s), may be required to implement a technique in accordance with one or more aspects of the disclosure. Further yet, two or more of the disclosed techniques can be implemented in combination with each other, to accomplish one or more features and/or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 8:
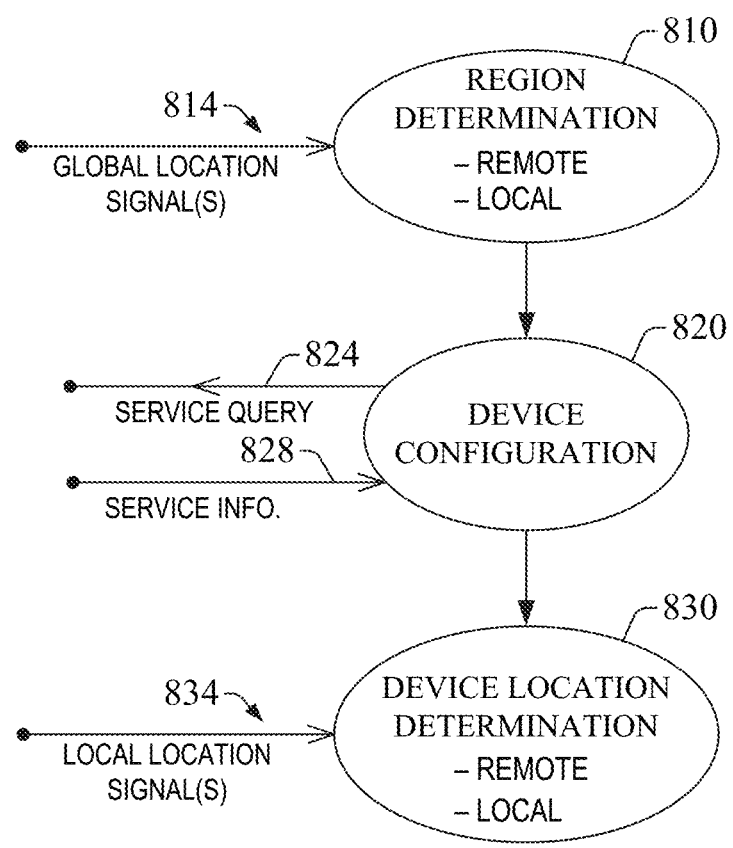
FIGS. 8-12 present examples of techniques in accordance with one or more aspects of the disclosure.

FIG. 8 presents an example of a process for agile acquisition of location service(s) in accordance with one or more aspects of the disclosure. A computing device (e.g., computing device 510 or computing device 710) having at least one processor or being functionally coupled to at least one processor can implement (e.g., compile, execute, compile and execute, etc.) one or more blocks of the subject process. In the exemplified process, at block 810, a region in which the computing device is present can be determined. As described herein, in certain implementations, the region can be determined at a remote computing device (such as a network node). In other implementations, the region can be determined locally at the computing device. Regardless of the modality (e.g., remote or local) of determination of the region, the computing device acquires or otherwise accesses global location signal(s) 814, which can be provided by a GLI transmitter (represented with a solid dot in FIG. 8) in accordance with aspects described herein.

At block 820, the computing device can be configured to consume a specific location service that is available in the region determined at block 820. To at least such an end, in certain embodiments, the computing device can communicate a service query 824 for identification of location service(s) that are available in the region, and in response, the computing device can receive information (e.g. a list or other information structure) indicative of one or more location services that may be available in the region. Such information may be referred to as service information 828. The computing device can be configured to consume at least one of the location service(s) conveyed by the service information 828. As described herein, the service query 824 can be communicated to a remote computing device (represented with a solid dot, which can be embodied in or can comprise, e.g., a network node within the GLI that includes the GLI transmitter that provides the signal(s) 814). The remote computing device can utilize or otherwise leverage information indicative of the region in order to provide (e.g., acquire and communicate) at least a portion of the service information 828.

At block 830, the computing device that is configured to consume the location service available in the region in which such a device is present can determine a location of the computing device. As described herein, such a location can be determined in at least two modalities: remote and local. In either modality, the computing device can acquire or otherwise access local location signal(s) 834 that can be provided by a local location infrastructure (LLI) transmitter that is associated with the location service, and based on the such signal(s), the location of the computing device can be determined. In the remote modality, a location query (not shown) containing at least a portion of the local location signal(s) 834 can be communicated to a remote computing device. In response, the remote computing device can determine the location and can convey it to the computing device. In the alternative, in the local modality, the computing device can utilize or otherwise leverage at least the local location signal(s) 834 in order to determine the location of the computing device.

Figure 9A:
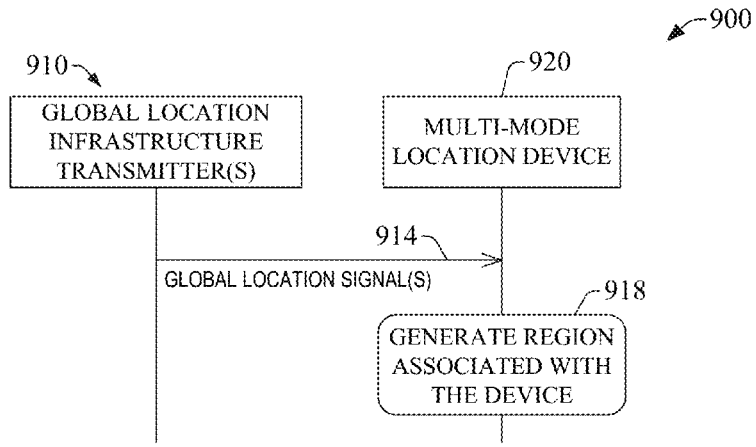
Figure 9B:
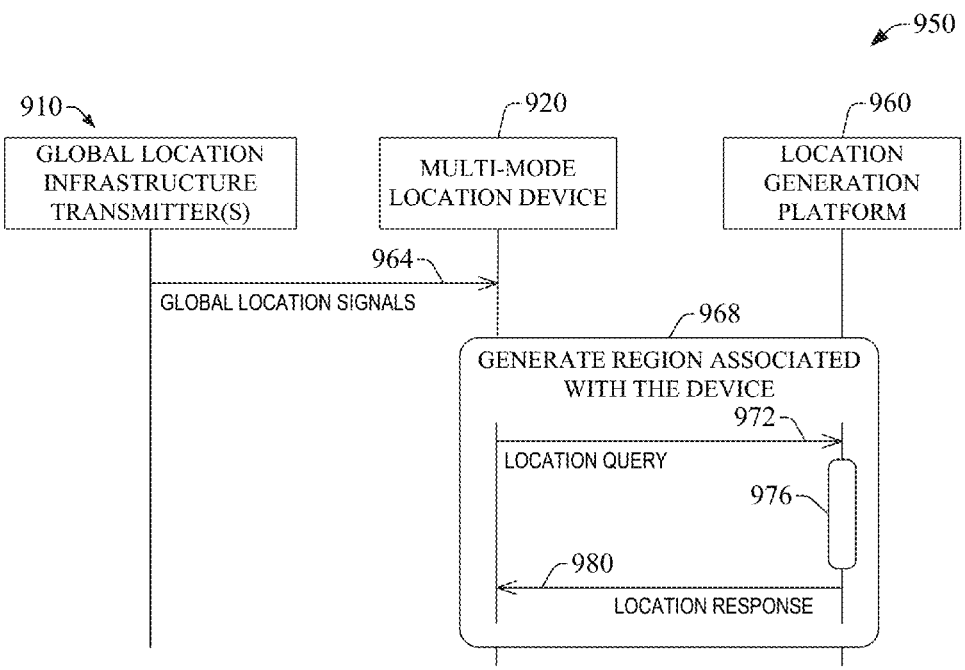

FIGS. 9A-9B present examples of processes for determination of a region in which a computing device is present according to one or more aspects of the disclosure. Each of such example processes can embody or can constitute block 810 described herein, where the region can be determined locally at the computing device in example process 900, and the region can be determined remotely from the computing device in example process 950. One or more GLI transmitters 910 can communicate global location signal(s) 914, which can be received, at least in part, by a multi-mode location device 920. As described herein, such a device can be embodied in or can constitute a computing device that can acquire (e.g., receive, decode, receive and decode, or the like) signals from a GLI transmitter (e.g., a GPS satellite, a macro-cellular station, or the like). At block 918, the multi-mode location device can generate the region associated with the device. Such a region represents or is otherwise indicative of a coarse location of the multi-mode location device 920.

Regarding example process 950, one or more GLI transmitters 910 can communicate global location signals 964, and the multi-mode location device 920 can acquire at least a portion of such signals. Based on at least the portion of the global location signals 964, a region associated with the device can be generated at block 968. As illustrated, generation of information indicative of the region can include operations in the multi-mode location device 920 and a location generation platform 960. In one aspect, the multi-mode location device 920 can communicate a location query 972 to the location generation platform 960. The location query 972 can include information indicative of at least a portion of the global location signals 964. The location generation platform 960 can acquire at least the portion of the global location signals 964, and based on the acquired signals, the location generation platform 960 can generate region information indicative or otherwise representative of the region at block 976. The location generation platform 960 can communicate a location response 980 to the multi-mode location device 920, wherein the location response 980 can include at least a portion of the region information. The multi-mode location device 920 can acquire the location response 980 and the associated region information, thus acquiring the region in which the multi-mode location device is present.

Figure 10:
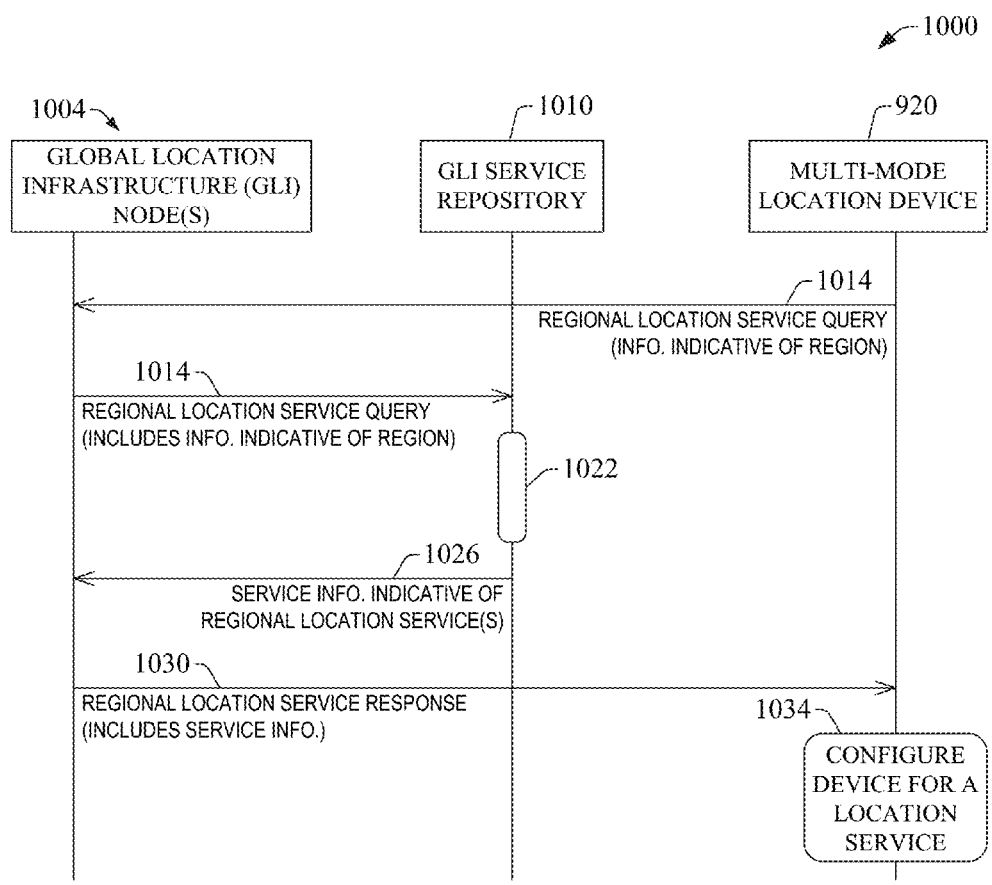

As described herein, availability of a region in which a computing device (e.g., the multi-mode location device 920) is present can permit configuring the computing device for operation or otherwise reliance on a specific location service available in the region. FIG. 10 illustrates an example of a process 1000 for configuring the multi-mode location device 920 based at least on the region according to one or more aspects of the disclosure. The illustrative process 1000 can embody or can constitute the configuration stage associated with block 820. In one aspect of configuration, the multi-mode location device 920 can communicate a regional location service query 1014, which can include information indicative of the region in which the multi-mode location device 920 is present. A node (e.g., a server computer) of the one or more GLI nodes 1004 can receive such a query. In response, the node or another of the GLI node(s) 1004 can communicate the regional location service query 1014 to a GLI service repository 1010 or a manager unit thereof. As illustrated, such a repository or the manager unit thereof can acquire the query, and can identify or otherwise determine, at block 1022, regional location service(s) that are available at or are otherwise associated with the region. In addition, the GLI service repository or the manager unit thereof can communicate service information (info.) 1026 indicative of at least one of the regional location service(s) to at least one node of the GLI node(s) 1004. In response, the at least one node can acquire the service information, and can provide (e.g., generate, convey, generate and convey, or the like) a regional location service response 1030 to the multi-mode location device 920. Such a response can include at least a portion of the service information indicative of the regional location service(s). As illustrated, at block 1034, the multi-mode location device 920 can be configured for a location service of the regional location service(s). In certain environment the information indicative of a geographical region and/or an associated location service can originate from a network node or other functional element in a 3GPP RAN. It should be appreciated that such information also can originate from other network(s) and/or telecommunication architecture(s).

Figure 11A:
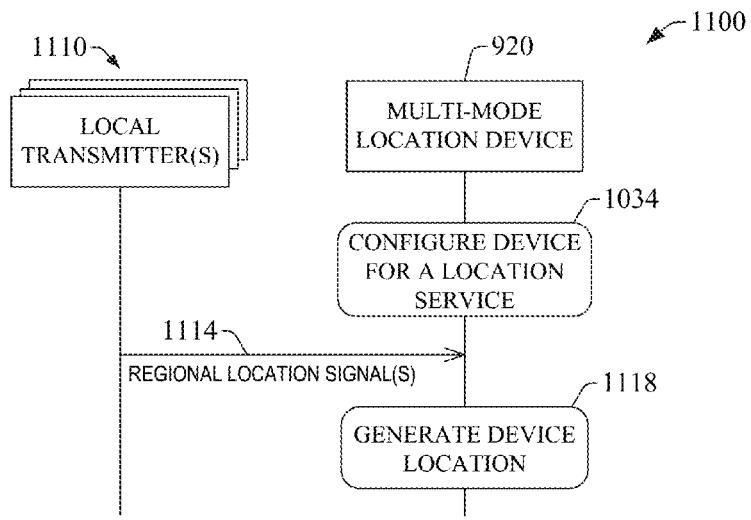
Figure 11B:
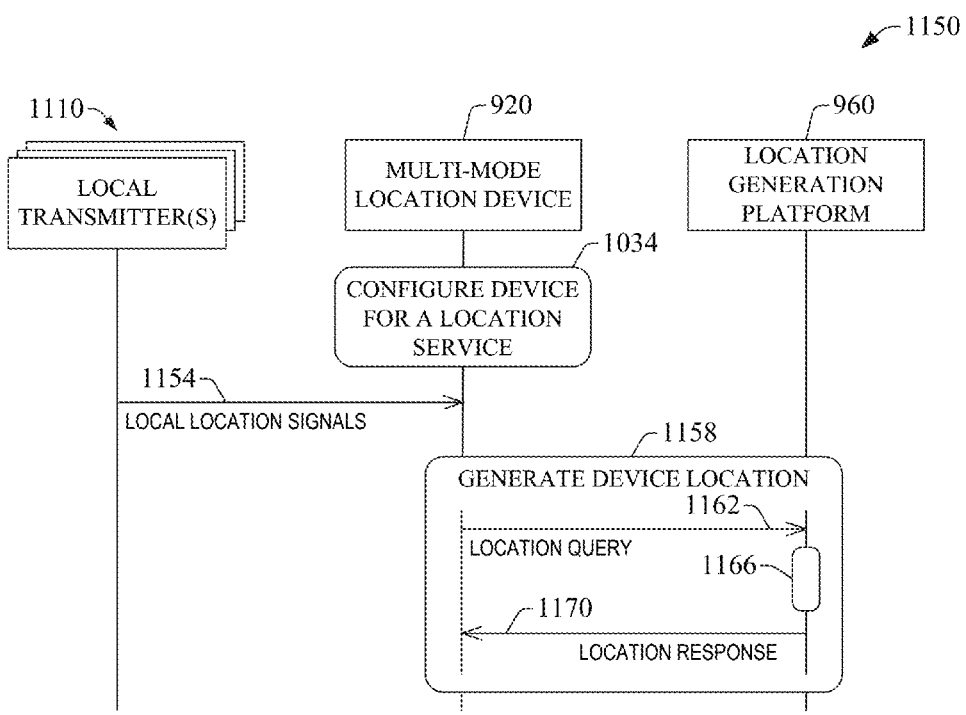

As described in connection with block 830, for example, a computing device that is configured for a regional location service can determine a device location of the computing device based at least on regional location signals. FIGS. 11A-11B illustrate examples of processes for determining a location of the multi-mode location device 920 based at least on regional location signals according to one or more aspects of the disclosure. Each of the illustrative processes 1100 and 1150 can embody or can constitute the service consumption stage associated with block 830. As illustrated, at block 1034, the multi-mode location device 920 can be configured for a location service, which can embody or can comprise the regional location service. In addition, at least one transmitter of one or more local transmitters 1110 associated with the regional location service can communicate regional location signal(s) 1114 to the multi-mode location device 920. In response, the multi-mode location device 920 can acquire at least a portion of the regional location signal(s) 1114, and can generate a device location at block 1118. It can be readily appreciated that in the illustrative process 1100 the device location is determined locally at the multi-mode location device.

The multi-mode location device 920 also can access (e.g., determine or identify) the location of the multi-mode location device 920 remotely, based at least on a regional location service available at the region in which the device is present. In the illustrative process 1150, at block 1034, the multi-mode location device 920 can be configured for a location service that can embody or can comprise the regional location service. In addition, at least one transmitter of one or more local transmitters 1110 associated with the regional location service can communicate regional location signal(s) 1154 to the multi-mode location device 920. In response, the multi-mode location device 920 can acquire at least a portion of the regional location signal(s) 1154, and based at least on such signals, a device location can be generated at block 1158. Generation of information indicative of the region can include operations in the multi-mode location device 920 and a location generation platform 960. In one aspect, the multi-mode location device 920 can communicate a location query 1162 to the location generation platform 960, where the location query 972 can include information indicative of at least a portion of the local location signals 1154. The location generation platform 960 can acquire at least the portion of the local location signals 1154, and at block 1166, the location generation platform 960 can generate location information indicative or otherwise representative of the device location of the multi-mode location device 960 based at least on the local location signals that are acquired. The location generation platform 960 can communicate a location response 1170 to the multi-mode location device 920, wherein the location response 980 can include at least a portion of the location information. The multi-mode location device 920 can acquire the location response 1170 and the associated location information, thus acquiring the device location associated with (e.g., representative of) the position of the multi-mode location device 920.

Figure 12:
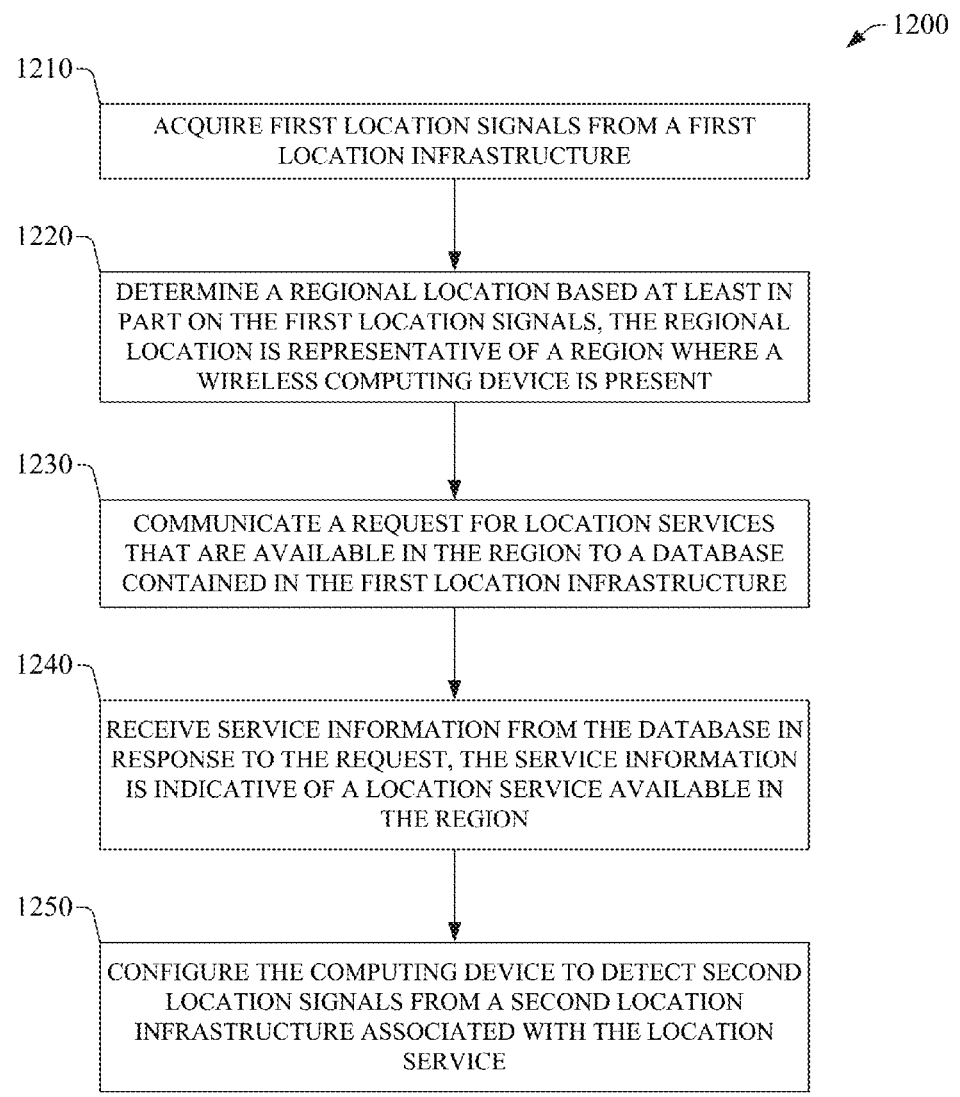

FIG. 12 presents a flowchart of an example method 1200 for agile acquisition of location service availability according to at least certain aspects of the disclosure. A wireless computing device (e.g., computing device 110 or computing device 510) having at least one processor functionally coupled to at least one memory device can implement one or more blocks of the example method 1200. At block 1210, the wireless computing device can acquire first location signals (e.g., global location signals) from a first location infrastructure (e.g., a global location infrastructure, such as a global location transmitter). At block 1220, the wireless device can determine a regional location based at least in part on the first location signals, where the regional location can be representative or otherwise indicative of a region (e.g., a country, a state, or a province) where the wireless computing device is present. In one aspect, determining the regional location of the computing device based at least on the first location signals can include generating information indicative of the regional location by the computing device. As described herein, the wireless computing device, via a location generation platform 540, for example, can generate at least a portion of such information. In another aspect, determining the regional location of the computing device based at least on the first location signals can comprise querying a remote computing device (such as a repository 150 or a database manager therein or functionally coupled thereto) for information indicative of the regional location. The wireless computing device can communicate a query having at least a portion of the acquired first location signals to the remote computing device.

At block 1230, the wireless computing device can communicate a request for location services that are available in the region to a database contained in the first location infrastructure (e.g., the global location infrastructure). It should be appreciated that, in one aspect, the request can be communicated automatically as part of a protocol for synchronization or acquisition of location based services (such as a navigation service). In addition, the database can be contained within the wireless computing device, and such a request can be embodied in or can include signaling transmitted to the database (e.g., service(s) information 536) within the wireless device. At block 1240, the wireless computing device can receive or otherwise acquired service information from the database in response to the request. At least a portion of the service information can be indicative of a location service available in the region. At block 1250, the wireless computing device can be configured to detect second location signals (e.g., local location signals) from a second location infrastructure (e.g., a local location infrastructure) associated with the location service. In one aspect, the wireless computing device can configure itself, via a location service selector 526, for example. In certain embodiments, the example method 1200 can further include determining a location of the computing device based at least in part on the detected second location signals (e.g., the detected local location signals).

Further or alternative example embodiments of the disclosure emerge from the description herein and annexed drawings. In one example embodiment, the disclosure provide a method for agile acquisition of location service availability. The method or one or more operations thereof can be performed by a wireless computing device (e.g., computing device 110), and can comprise acquiring first location signals (e.g., global location signals) from a first location infrastructure (e.g., a global location infrastructure). The method also can comprise determining a regional location based at least in part on the first location signals (e.g., the global location signals), where the regional location can be representative or otherwise indicative of a region where the computing device is present. In one aspect, determining the regional location of the computing device based at least on the first location signals (e.g., the global location signals) can include generating information indicative of the regional location by the computing device. In another aspect, determining the regional location of the computing device based at least on the first location signals (e.g., global location signals) can comprise querying a remote computing device for information indicative of the regional location.

In addition, such a method can include communicating a request for location services that are available in the region to a database contained in the first location infrastructure (e.g., the global location infrastructure). It should be appreciated that, in one aspect, the request can be communicated automatically as part of a protocol for synchronization or acquisition of location based services (such as a navigation service). Moreover, the method can include receiving service information from the database in response to the request, where the service information is indicative of a location service available in the region. Further, the method can include configuring the computing device to detect second location signals (e.g., local location signals) from a second location infrastructure (e.g., a local location infrastructure) associated with the location service. In certain implementations, the method can further include determining a location of the computing device based at least in part on the detected second location signals (e.g., the detected local location signals).

In other example embodiments, the disclosure can provide another method for acquisition of location service availability. The method or at least one operation thereof can be performed (e.g., executed) by a wireless computing device in accordance with aspects of the disclosure, such as computing device 110. The method can include identifying a region associated with a computing device based on first location signals from a first location unit. In one implementation, identifying the region associated with the computing device can include acquiring global location signals from a remote computing device, and obtaining a regional location of the computing device based at least on the global location signals, the regional location being indicative of the region associated with the computing device. In such an implementation, obtaining the regional location of the computing device based at least on the global location signals can include mapping a logical address contained in the global location signals to the regional location, the logical address being associated with the computing device. In another implementation, identifying the region associated with the computing device comprises acquiring global location signals from a cellular telecommunication network, and acquiring a regional location of the computing device based at least on the global location signals, the regional location being indicative of the region associated with the computing device. In such an implementation, acquiring the regional location of the computing device based at least on the global location signals can comprise determining a country code from at least a portion of the global location signals, wherein the country code being representative of the regional location. For instance, determining the country code can include extracting or otherwise decoding the country code from pilot signals (e.g., BCCH signals) included in the global location signals. In yet another implementation, identifying the region associated with the computing device comprises acquiring global location signals from a global navigation satellite system, and acquiring a regional location of the computing device based at least on the global location signals, the regional location being indicative of the region associated with the computing device. In one aspect of such an implementation, acquiring the regional location of the computing device based at least on the global location signals comprises generating information indicative of the regional location by the computing device. In another aspect, acquiring the regional location of the computing device based at least on the global location signals comprises querying a remote computing device for information indicative of the regional location.

In addition, the method can include accessing information indicative of a location service available in the region based at least on information indicative of the region, the location service is provided at least in part by a second location unit. In one aspect, accessing the information indicative of the location service available in the region comprises querying a remote computing device for information indicative of location services available in the region, and receiving the information indicative of the location service available in the region in response to the querying. Moreover, the method can comprise configuring the computing device to access the location service via at least the second location unit. In one aspect, configuring the computing device to access the location service via at least the second location unit comprises configuring the computing device to detect regional location signals, and to process at least a portion of the regional location signals.

In certain implementations, the method can further comprise acquiring a location of the computing device based at least on location information acquired from the second location unit.

The disclosure is not limited to techniques, and in certain embodiments, the disclosure can provide at least one computer-readable non-transitory storage medium (e.g., memory 534 or memory 730) encoded with computer-accessible instructions (e.g., pairing component(s) 258) that, in response to execution, cause at least one processor (e.g., one or more of processor(s) 714) to perform acquisition of location service availability operations including acquiring global location signals from a global location infrastructure. The operations also can include determining a regional location based at least in part on the global location signals, where the regional location is representative of a region where the computing device is present. As described herein, in certain implementations, determining the regional location of the computing device based at least on the global location signals comprises querying a remote computing device for information indicative of the regional location. In addition, the operations can include communicating a request for location services that are available in the region to a database contained in the global location infrastructure; and receiving service information from the database in response to the request, the service information is indicative of a location service available in the region. Further, the operations can include configuring the computing device to detect local location signals from a local location infrastructure associated with the location service.

In certain implementations of the at least one computer-readable non-transitory storage medium, the acquisition of location service operations can further comprise determining a location of the computing device based at least in part on the detected local location signals. In one aspect, determining the regional location of the computing device based at least on the global location signals comprises generating information indicative of the regional location by the computing device.

In other example embodiments, the disclosure can provide at least one computer-readable non-transitory storage medium encoded with computer-accessible instructions that, in response to execution, cause at least one processor to perform acquisition of location service availability operations. The operations can include identifying a region associated with a computing device based on first location signals from a first location unit; accessing information indicative of a location service available in the region based at least on information indicative of the region, the location service is provided at least in part by a second location unit; and configuring the computing device to access the location service via at least the second location unit. In one aspect, as described herein, accessing the information indicative of the location service available in the region comprises querying a remote computing device for information indicative of location services available in the region, and receiving the information indicative of the location service available in the region in response to the querying. In another aspect, identifying the region associated with the computing device can include acquiring global location signals from a remote computing device, and obtaining a regional location of the computing device based at least on the global location signals, where the regional location being indicative of the region associated with the computing device. Obtaining the regional location of the computing device based at least on the global location signals can comprise mapping a logical address contained in the global location signals to the regional location, the logical address being associated with the computing device. In yet another aspect, identifying the region associated with the computing device can include acquiring global location signals from a cellular telecommunication network, and acquiring a regional location of the computing device based at least on the global location signals, wherein the regional location being indicative of the region associated with the computing device. Acquiring the regional location of the computing device based at least on the global location signals comprises determining/extracting a country code from at least a portion of the global location signals, the country code being representative of the regional location. In still another aspect, identifying the region associated with the computing device can include acquiring global location signals from a global navigation satellite system, and acquiring a regional location of the computing device based at least on the global location signals, the regional location being indicative of the region associated with the computing device. Acquiring the regional location of the computing device based at least on the global location signals comprises generating information indicative of the regional location by the computing device. In addition or in the alternative, acquiring the regional location of the computing device based at least on the global location signals comprises querying a remote computing device for information indicative of the regional location.

In one implementation, configuring the computing device to access the location service via at least the second location unit comprises configuring the computing device to detect regional location signals, and to process at least a portion of the regional location signals.

In addition, in certain implementations, the operations performed in response to execution of the computer-accessible instructions can include acquiring a location of the computing device based at least on location information acquired from the second location unit.

In certain example embodiments, the disclosure can provide an apparatus for acquisition of location service availability, where the apparatus can include means for acquiring global location signals from a global location infrastructure. The apparatus also can include means for determining a regional location based at least in part on the global location signals, where the regional location is representative of a region where the computing device is present. In one aspect, the means for determining the regional location of the computing device based at least on the global location signals comprises means for generating information indicative of the regional location by the computing device. In another aspect, the means for determining the regional location of the computing device based at least on the global location signals can include comprises means for querying a remote computing device for information indicative of the regional location. In addition, the apparatus can include means for communicating a request for location services that are available in the region to a database contained in the global location infrastructure. Moreover, the apparatus can include means for receiving service information from the database in response to the request, where the service information is indicative of a location service available in the region. Further, the apparatus can include means for configuring the computing device to detect local location signals from a local location infrastructure associated with the location service.

In certain implementations, the apparatus can include means for determining a location of the computing device based at least in part on the detected local location signals.

In other embodiments, the disclosure provide another apparatus for acquisition of location service availability. Such an apparatus can include means for identifying a region associated with a computing device based on first location signals from a first location unit; means for accessing information indicative of a location service available in the region based at least on information indicative of the region, the location service is provided at least in part by a second location unit; and means for configuring the computing device to access the location service via at least the second location unit.

In such an apparatus, the means for acquiring the regional location of the computing device based at least on the global location signals can include comprises means for querying a remote computing device for information indicative of the regional location. In addition, the means for identifying the region associated with the computing device comprises means for acquiring global location signals from a remote computing device, and means for obtaining a regional location of the computing device based at least on the global location signals, wherein the regional location being indicative of the region associated with the computing device. The means for obtaining the regional location of the computing device based at least on the global location signals comprises means for mapping a logical address contained in the global location signals to the regional location, the logical address being associated with the computing device. In addition or in the alternative, the means for identifying the region associated with the computing device comprises means for acquiring global location signals from a cellular telecommunication network, and means for acquiring a regional location of the computing device based at least on the global location signals, where the regional location being indicative of the region associated with the computing device. The means for acquiring the regional location of the computing device based at least on the global location signals can include comprises means for determining a country code from at least a portion of the global location signals, the country code being representative of the regional location. Moreover or an another alternative, the means for identifying the region associated with the computing device comprises means for acquiring global location signals from a global navigation satellite system, and means for acquiring a regional location of the computing device based at least on the global location signals, the regional location being indicative of the region associated with the computing device. The means for acquiring the regional location of the computing device based at least on the global location signals comprises means for generating information indicative of the regional location by the computing device.

In one aspect, in such an apparatus, the means for configuring the computing device to access the location service via at least the second location unit can include means for configuring the computing device to detect regional location signals, and means for configuring the computing device to process at least a portion of the regional location signals. In another aspect, the means for accessing the information indicative of the location service available in the region can include means for querying a remote computing device for information indicative of location services available in the region, and means for receiving the information indicative of the location service available in the region in response to the querying.

In one or more implementations, the apparatus can further include means for acquiring a location of the computing device based at least on location information acquired from the second location unit.

In other embodiments, the disclosure provides a computing device for acquisition of location service availability. The computing device can include at least one memory device having programmed instructions. In addition, the computing device can include at least one processor functionally coupled to the at least one memory device and configured to execute the programmed instructions. In response to execution of the programmed instructions, the at least one processor can be further configured to acquire global location signals from a global location infrastructure; to determine a regional location based at least in part on the global location signals, where the regional location is representative of a region where the computing device is present; to communicate a request for location services that are available in the region to a database contained in the global location infrastructure; to receive service information from the database in response to the request, the service information is indicative of a location service available in the region; and to configure the computing device to detect local location signals from a local location infrastructure associated with the location service. In one aspect, to determine a regional location based at least in part on the global location signals the at least one processor can be further configured, in response to execution of the programmed instructions, to generate information indicative of the regional location by the computing device. In another aspect, to determine a regional location based at least in part on the global location signals the at least one processor can be further configured, in response to execution of the programmed instructions, to query a remote computing device for information indicative of the regional location.

In certain implementations of such a computing device, in response to execution of the programmed instructions, the at least one processor can be further configured to determine a location of the computing device based at least in part on the detected local location signals.

In additional or alternative embodiments, the disclosure provides another computing device for acquisition of location service availability. Such a computing device can comprise at least one memory device having programmed instructions (e.g., computer-accessible instructions encoded thereon). In addition, the computing device can include and at least one processor functionally coupled to the at least one memory device and configured to execute the programmed instructions, where in response to execution of the programmed instructions, the at least one processor can be further configured to identify a region associated with a computing device based on first location signals from a first location unit; to access information indicative of a location service available in the region based at least on information indicative of the region, the location service is provided at least in part by a second location unit; and to configure the computing device to access the location service via at least the second location unit. In certain implementations, in response to execution of the programmed instructions, the at least one processor can be further configured to acquire a location of the computing device based at least on location information acquired from the second location unit. In one aspect, to access at least a portion of the information indicative of the location service available in the region based at least on information indicative of the region, the at least one processor can be further configured, in response to execution of the programmed instructions, to query a remote computing device for information indicative of location services available in the region, and to receive the information indicative of the location service available in the region. In another aspect, to configure the computing device to access the location service via at least the second location unit, the at least one processor can be further configured, in response to execution of the programmed instructions, to configure the computing device to detect regional location signals, and to configure the computing device to process at least a portion of the regional location signals.

In one implementation, to identify a region associated with a computing device based on first location signals from a first location unit, the at least one processor included in the computing device can be further configured, in response to execution of the programmed instructions, to acquire global location signals from a remote computing device, and to obtain a regional location of the computing device based at least on the global location signals, the regional location being indicative of the region associated with the computing device. In addition, in such implementation, in response to execution of the programmed instructions, the at least one processor can be further configured to map a logical address contained in the global location signals to the regional location, the logical address being associated with the computing device.

In another implementation, to identify a region associated with a computing device based on first location signals from a first location unit, the at least one processor included in the computing device can be further configured, in response to execution of the programmed instructions, to acquire global location signals from a cellular telecommunication network, and to acquire a regional location of the computing device based at least on the global location signals, the regional location being indicative of the region associated with the computing device. In such an implementation, in response to execution of the programmed instructions, the at least one processor can be further configured to determine a country code from at least a portion of the global location signals, where the country code can be representative of the regional location.

In yet another implementation, to identify a region associated with a computing device based on first location signals from a first location unit, the at least one processor included in the computing device can be further configured, in response to execution of the programmed instructions, to acquire global location signals from a global navigation satellite system, and to acquire a regional location of the computing device based at least on the global location signals, where the regional location being indicative of the region associated with the computing device.

In order to acquire the regional location of the computing device based at least on the global location signals, the at least one processor can be configured, in response to execution of the programmed instructions, to generate information indicative of the regional location by the computing device. In addition or in the alternative, to acquire the regional location information, the at least one processor can be further configured, in response to execution of the programmed instructions, to query a remote computing device for information indicative of the regional location.

The disclosure provides other example embodiments for agile acquisition of location services in a device in accordance with aspects described herein. For example, the disclosure provides at least one processor-accessible storage device having programmed instructions for acquisition of location service availability that, in response to execution, cause at least one processor to perform any of the methods described or otherwise conveyed herein. For another example, the disclosure can provide at least one processor-accessible storage device having programmed instructions for acquisition of location service availability that, in response to execution, cause at least one processor to perform a method or realize an apparatus as described or otherwise conveyed herein. For yet another example, the disclosure can provide an apparatus that can include means for performing one or more of the methods described or otherwise conveyed herein. For still another example, the disclosure provides a computing device for acquisition of location service availability. The computing device can include a radio unit configured to exchange information with a wireless computing device; a location service selector functionally coupled to the radio unit; a location generation driver functionally coupled to the location service selector and the radio unit; and a location generation platform functionally coupled to the location generation driver, the location service selector, and the radio unit. In the addition, the computing device can be arranged to perform to perform any of the methods described or otherwise conveyed herein.

Several advantages over conventional technologies for acquisition of location services emerge from the present specification and annexed drawings. One example advantage may include improved performance (e.g. lesser search time and lesser power consumption associated with identifying the available services) of computing devices that utilize or otherwise consume location services, and ensuing improved end-user experience or perceived quality of service. Another example advantage may include cost reduction via reduction of production cycle(s) and/or chipset size(s). In particular, yet not exclusively, device complexity can be reducing or otherwise containing availability of superfluous functionality in a device, with the ensuing reduction in the amount of SKUs and special configuration of the device. Yet another advantage may include increased reliability of computing devices (e.g., location devices) that consume location services (e.g., navigation services) from a plurality of sources. Still another example may include the implementation of slim system design, where network infrastructure can be reused between location service systems in instances in which functional elements or parts of the subsystem are not available or need not be used.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide agile acquisition of location services in a device, such as a multi-mode location device. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. At least one computer-readable non-transitory storage medium encoded with computer-accessible instructions that, in response to execution, cause at least one processor to perform acquisition of location service availability operations comprising:
    acquiring global location signals from a global location infrastructure, the global location signals comprising a logical address associated with a computing device;
    determining a regional location based at least in part on the global location signals, the regional location is representative of a region where the computing device is present;
    determining information indicative of the determined regional location, the information indicative of the region comprising a country code of the region;
    communicating a request for location services that are available in the region to a database contained in the global location infrastructure, the request comprising the information indicative of the regional location;
    mapping the logical address associated with the computing device to the information indicative of the regional location;
    receiving identifying service information from the database in response to the request, the service information is indicative of a location service available in the region;
    configuring the computing device to detect local location signals from a local location infrastructure associated with the location service; and
    outputting the service information.

2. The at least one computer-readable non-transitory storage medium of claim 1, wherein the acquisition of location service availability operations further comprises:
    determining a location of the computing device based at least in part on the detected local location signals.

3. The at least one computer-readable non-transitory storage medium of claim 2, wherein determining the regional location of the computing device based at least on the global location signals comprises:
    querying a remote computing device for information indicative of the regional location.

4. At least one computer-readable non-transitory storage medium encoded with computer-accessible instructions that, in response to execution, cause at least one processor to perform acquisition of location service availability operations comprising:
    identifying a region associated with a computing device based on first location signals from a first location unit, wherein the first location signals comprise a logical address associated with the computing device;
    determining information indicative of the region, the information indicative of the region comprising a country code of the region;
    communicating a request for location services that are available in the region to a database associated with the first location unit, the request comprising the information indicative of the region;
    mapping the logical address associated with the computing device to the information indicative of the region;
    accessing identifying, in response to the request, information indicative of a location service available in the region based at least on information indicative of the region, the location service is provided at least in part by a second location unit;
    configuring the computing device to access the location service via at least the second location unit; and
    outputting the service information.

5. The at least one computer-readable non-transitory storage medium of claim 4, wherein the acquisition of location service availability operations further comprises:
    acquiring a location of the computing device based at least on location information acquired from the second location unit.

6. The at least one computer-readable non-transitory storage medium of claim 4, wherein configuring the computing device to access the location service via at least the second location unit comprises:
    configuring the computing device to detect regional location signals, and to process at least a portion of the regional location signals.

7. The at least one computer-readable non-transitory storage medium of claim 4, wherein accessing identifying the information indicative of the location service available in the region comprises:
    querying a remote computing device for information indicative of location services available in the region, and
    receiving the information indicative of the location service available in the region in response to the querying.

8. The at least one computer-readable non-transitory storage medium of claim 4, wherein identifying the region associated with the computing device comprises:
    acquiring global location signals from a remote computing device, and obtaining a regional location of the computing device based at least on the global location signals, the regional location being indicative of the region associated with the computing device.

9. The at least one computer-readable non-transitory storage medium of claim 4, wherein identifying the region associated with the computing device comprises:
    acquiring global location signals from a cellular telecommunication network, and
    acquiring a regional location of the computing device based at least on the global location signals, the regional location being indicative of the region associated with the computing device.

10. The at least one computer-readable non-transitory storage medium of claim 9, wherein acquiring the regional location of the computing device based at least on the global location signals comprises:
    determining/extracting the country code from at least a portion of the global location signals, the country code being representative of the regional location.

11. The at least one computer-readable non-transitory storage medium of claim 4, wherein identifying the region associated with the computing device comprises:
    acquiring global location signals from a global navigation satellite system, and acquiring a regional location of the computing device based at least on the global location signals, the regional location being indicative of the region associated with the computing device.

12. The at least one computer-readable non-transitory storage medium of claim 11, wherein acquiring the regional location of the computing device based at least on the global location signals comprises:
    generating information indicative of the regional location by the computing device.

13. The at least one computer-readable non-transitory storage medium of claim 11, wherein acquiring the regional location of the computing device based at least on the global location signals comprises:
    querying a remote computing device for information indicative of the regional location.

14. A computing device for acquisition of location service availability, comprising:
  at least one memory device having programmed instructions; and at least one processor functionally coupled to the at least one memory device and configured to execute the programmed instructions, and in response to execution of the programmed instructions, further configured to:
  identify a region associated with a computing device based on first location signals from a first location unit, wherein the first location signals comprise a logical address associated with the computing device;
  determine information indicative of the region, the information indicative of the region comprising a country code of the region;
  communicate a request for location services that are available in the region to a database associated with the first location unit, the request comprising the information indicative of the region;
  map the logical address associated with the computing device to the information indicative of the region;
  identify, in response to the request, information indicative of a location service available in the region based at least on information indicative of the region, the location service is provided at least in part by a second location unit;
  configure the computing device to access the location service via at least the second location unit; and
  output the service information.

15. The computing device of claim 14, in response to execution of the programmed instructions, the at least one processor being further configured to:
  acquire a location of the computing device based at least on location information acquired from the second location unit.

16. The computing device of claim 14, in response to execution of the programmed instructions, the at least one processor being further configured to:
  configure the computing device to detect regional location signals; and configure the computing device to process at least a portion of the regional location signals.

17. The computing device of claim 14, in response to execution of the programmed instructions, the at least one processor being further configured to:
  query a remote computing device for information indicative of location services available in the region, and
  receive the information indicative of the location service available in the region.

18. The computing device of claim 14, in response to execution of the programmed instructions, the at least one processor being further configured to:
  acquire global location signals from a remote computing device, and obtain a regional location of the computing device based at least on the global location signals via a mapping of a logical address contained in the global location signals to the regional location, the logical address being associated with the computing device, the regional location being indicative of the region associated with the computing device.

19. The computing device of claim 14, in response to execution of the programmed instructions, the at least one processor being further configured to:
  acquire global location signals from a cellular telecommunication network, and acquire a regional location of the computing device based at least on the global location signals, the regional location being indicative of the region associated with the computing device.

20. The computing device of claim 19, in response to execution of the programmed instructions, the at least one processor being further configured to:
  determine the country code from at least a portion of the global location signals, the country code being representative of the regional location.

21. The computing device of claim 14, in response to execution of the programmed instructions, the at least one processor being further configured to:
  acquire global location signals from a global navigation satellite system, and acquire a regional location of the computing device based at least on the global location signals, the regional location being indicative of the region associated with the computing device.

22. The computing device of claim 21, in response to execution of the programmed instructions, the at least one processor being further configured to:
  query a remote computing device for information indicative of the regional location.

* * * * *